UNITED STATES PATENT OFFICE.

CHARLES JOHN BUSKIST, OF NEW ALBION, AND JOHN WILLIAM MUTTER, OF WESLEY, NEW YORK.

PROCESS OF MAKING CHEESE.

No. 821,334. Specification of Letters Patent. Patented May 22, 1906.

Application filed February 26, 1906. Serial No. 303,101.

*To all whom it may concern:*

Be it known that we, CHARLES JOHN BUSKIST, residing at New Albion, and JOHN WILLIAM MUTTER, residing at Wesley, in the county of Cattaraugus and State of New York, citizens of the United States, have invented a new and useful Improved Process of Making Cheese, of which the following is a specification.

This invention relates to an improved process for making cheese in which less acid is used in developing the curd and the curd is mellowed and softened in cold water.

The principal objects of this invention are to materially increase the proportion of butter-fat saved, and thus produce a richer and better flavored cheese of firm texture which will cut or slice smoothly and not crumble or break off while being cut, and to decidedly increase the proportionate amount of cheese obtained from a certain quantity of milk, thereby increasing the cheese-producing power of the milk.

In manufacturing cheese heretofore the milk was first allowed to ferment up to a certain point and was partially assisted in its fermentation by rennet or other enzymes. Then the curd was cut by a curd-knife to allow the whey to escape and heated, and when a sufficient quantity of acid was on the curd the whey was drawn off and the curd thoroughly drained. The curd when drained sufficiently was cut into small pieces in a curd-mill, salted, pressed, and cured. Our improved process differs from the above-described process in that we use less acid and do not permit the curd to develop so rapidly or to such an advanced stage, and instead of salting the curd after the whey is drained off we cover the curd with pure cold water of a temperature of about 50° Fahrenheit. The advantage of this is that the curd is mellowed and softened in cold water instead of by acid, and as less acid is used and the curd is in the acid for a shorter period a large proportion of the butter-fats are retained in the curd instead of being forced into the whey by the action of the acid.

The cold-water bath not only retards or arrests the fermenting action in the curd, but it also cleans and removes all, or nearly all, of the remaining impurities in the curd and produces a soft, velvety, purified curd, the foundation of a fine rich cheese.

After the curd has been in the water a sufficient length of time to feel not harsh, but soft and silky when squeezed in the hand, the water is drawn from the curd-sink and the curd is stirred and permitted to drain until quite dry. It is then salted, put to press, and cured in any of the usual ways.

With our improved process a so much larger proportion of cheese is obtained from the milk that actually about one-half pound less milk is required to produce a pound of cheese than with the old process heretofore set forth. This is secured by the decrease in the waste of the butter-fats, which in the old process were forced into the whey by acid, and conseqently lost. The acid process by which a large amount of lactic is developed in the curd in order to make the cheese firm and at the same time mellow necessarily involves the use of a large quantity of milk to make a pound of cheese and at the same time an additional loss of butter-fat, which runs away in the "white whey" when the curd is put into the press and pressed. It is an invariable rule, recognized by all cheesemakers, that the more acid developed on the curd, the more milk is required to make a pound of cheese. A large amount of acid is necessary with all acid processes to produce a cheese of required firmness and mellowness that will hold its flavor. If no acid at all were "run on" (developed in) the curd, the cheese produced would not be firm or mellow and would quickly lose its flavor and become bitter. With our improved process the acid is merely started on the curd—*i. e.*, the action of the lactic acid is immediately stopped as soon as it is perceptibly evident that it has begun to develop on the curd and the mellowness and firmness of the cheese brought about by the use of the cold-water bath. In our improved process the acid is merely used as a starter and the curd is in it for a considerably shorter period than in the old acid process. The mellowing and softening of the curd is started by the acid and is finished in the cold-water bath, so that the action is performed partially by the acid and partially by water.

The chief advantages of our improved process are that we obtain a greater proportion of cheese from milk by decreasing the loss or waste of butter-fats in the whey, a better rind and surface are obtained for the cheese, and a better flavored, richer, and more palatable cheese of firmer and finer texture is secured which will cut or slice smoothly and not crumble or break off when cut. Cheese made by our improved process will also be more uniform in quality, will stand hot weather better, and when color is used will present a brighter, but not a varying or mottled appearance like some varieties of cheese made by the old process.

We claim as our invention—

1. An improved process for making cheese which consists in producing a milk-curd, removing the whey, mellowing and softening the curd in water, and finally salting, pressing and curing the curd to form cheese.

2. An improved process for making cheese which consists in producing a milk-curd, removing the whey, mellowing and softening the curd in pure cold water of about fifty degrees Fahrenheit, and finally forming the curd into cheese.

3. An improved process for making cheese which consists in producing a milk-curd by fermentation, removing the whey, and mellowing and softening the curd partially with acid and partially with pure cold water and finally forming the curd into cheese.

4. An improved process for making cheese which consists in producing a curd from milk, mellowing and softening the curd at least in part by immersion in pure cold water of about 50° Fahrenheit and finally forming the curd into cheese.

5. An improved process for making cheese which consists in producing a curd from milk, mellowing and softening the curd partially by acid and partially by immersion in pure cold water of about 50° Fahrenheit and finally forming the curd into cheese.

CHARLES JOHN BUSKIST.
JOHN WILLIAM MUTTER.

Witnesses:
L. M. SANGSTER,
GEO. A. NEUBAUER.